Patented Oct. 8, 1946

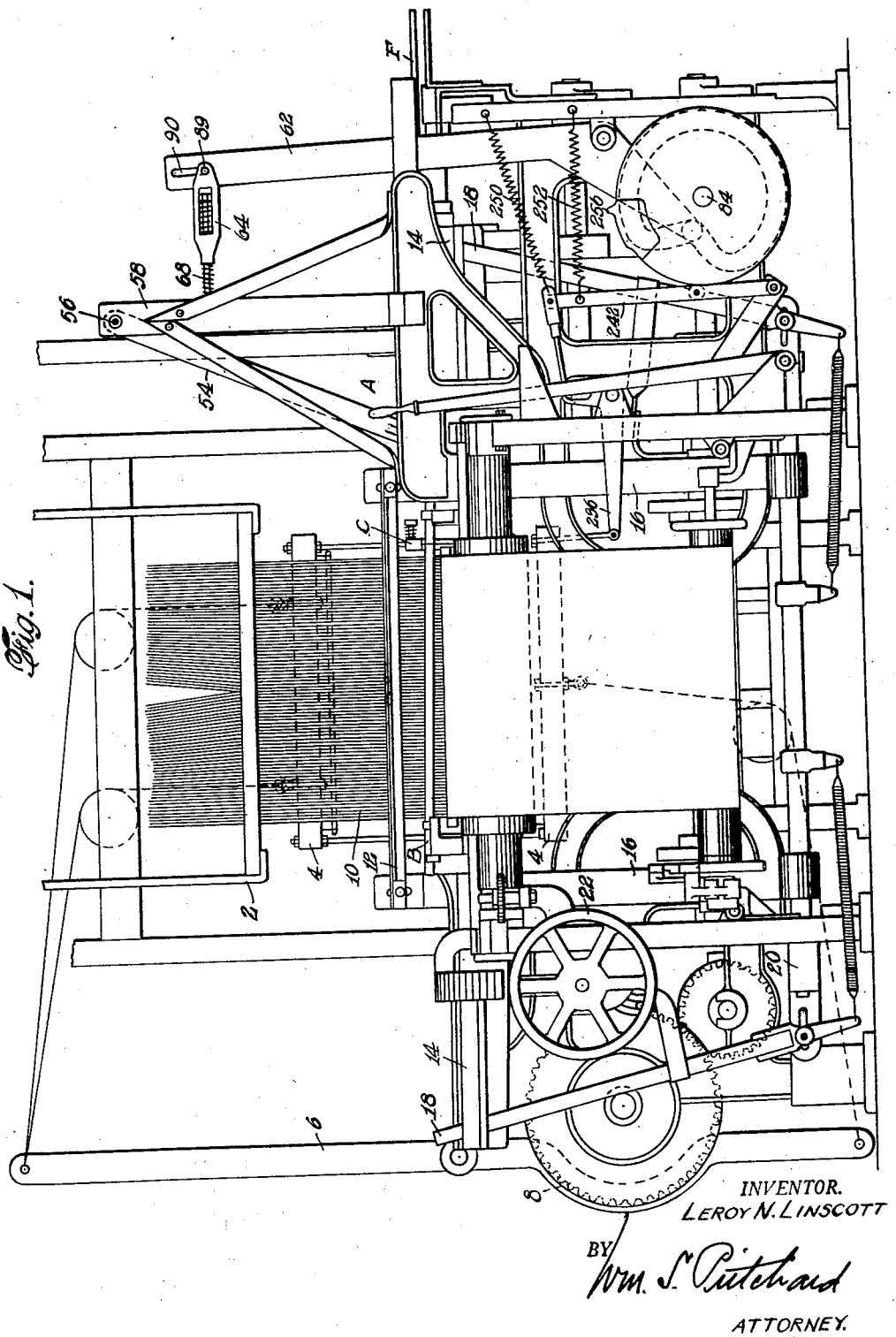

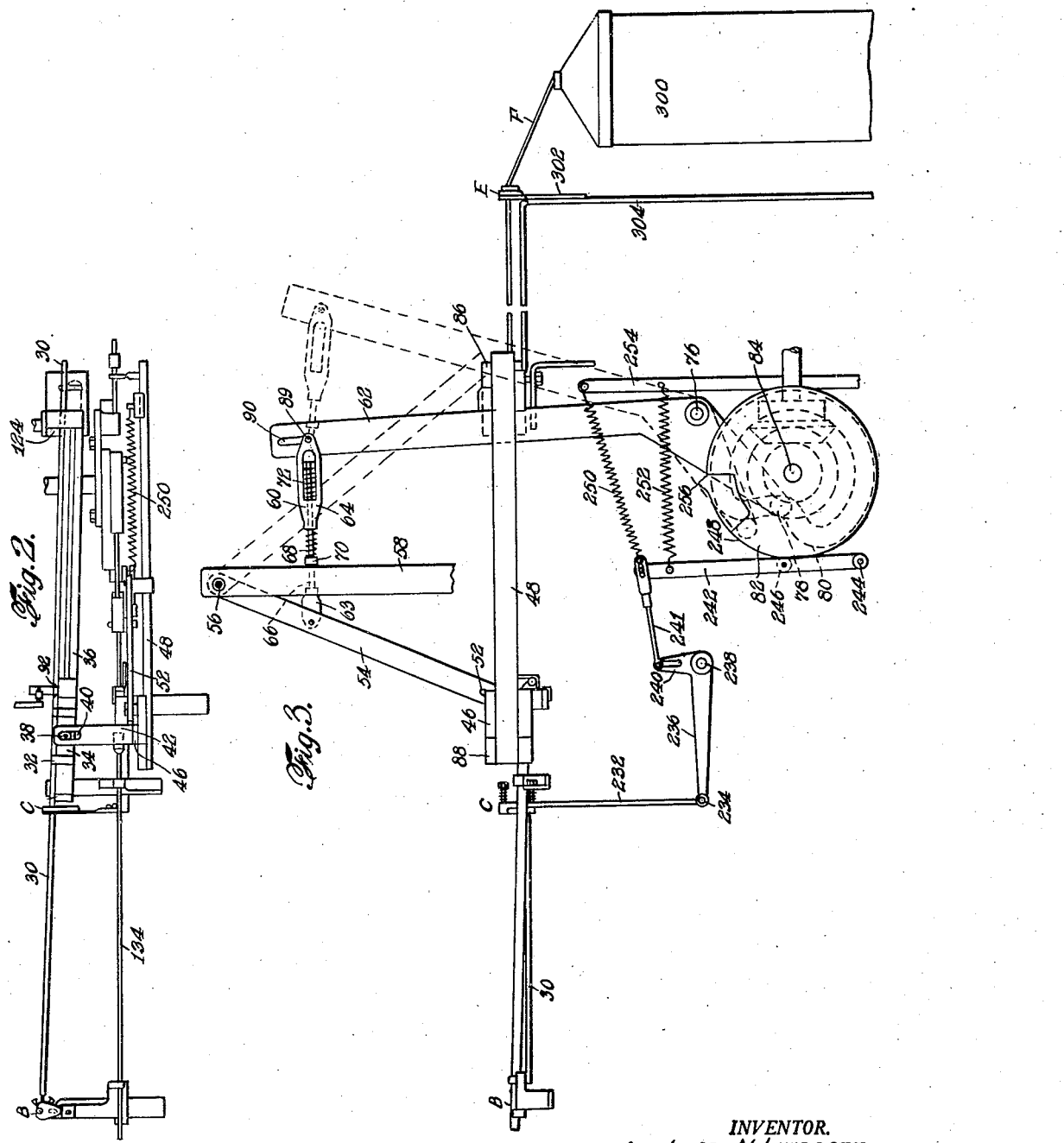

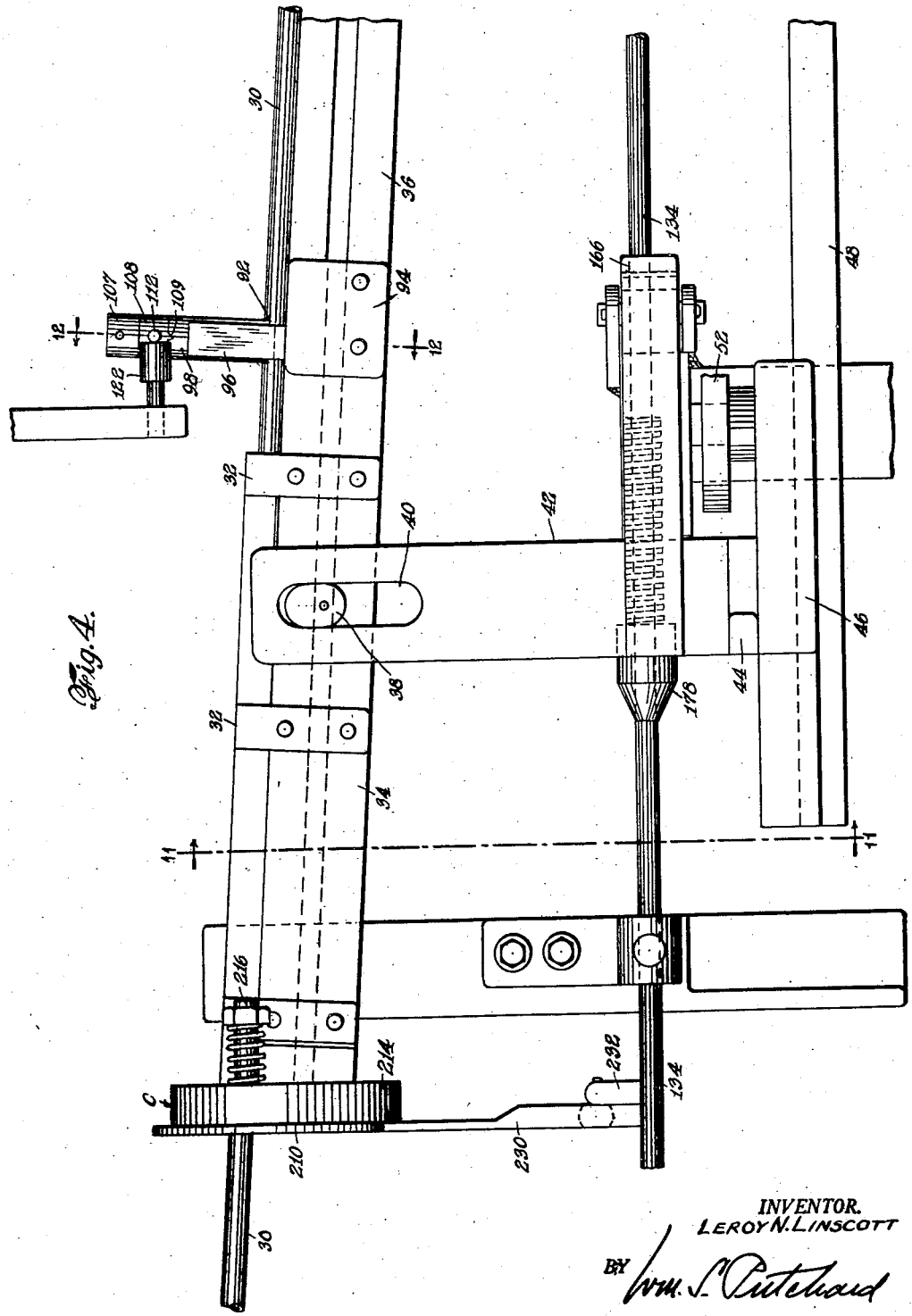

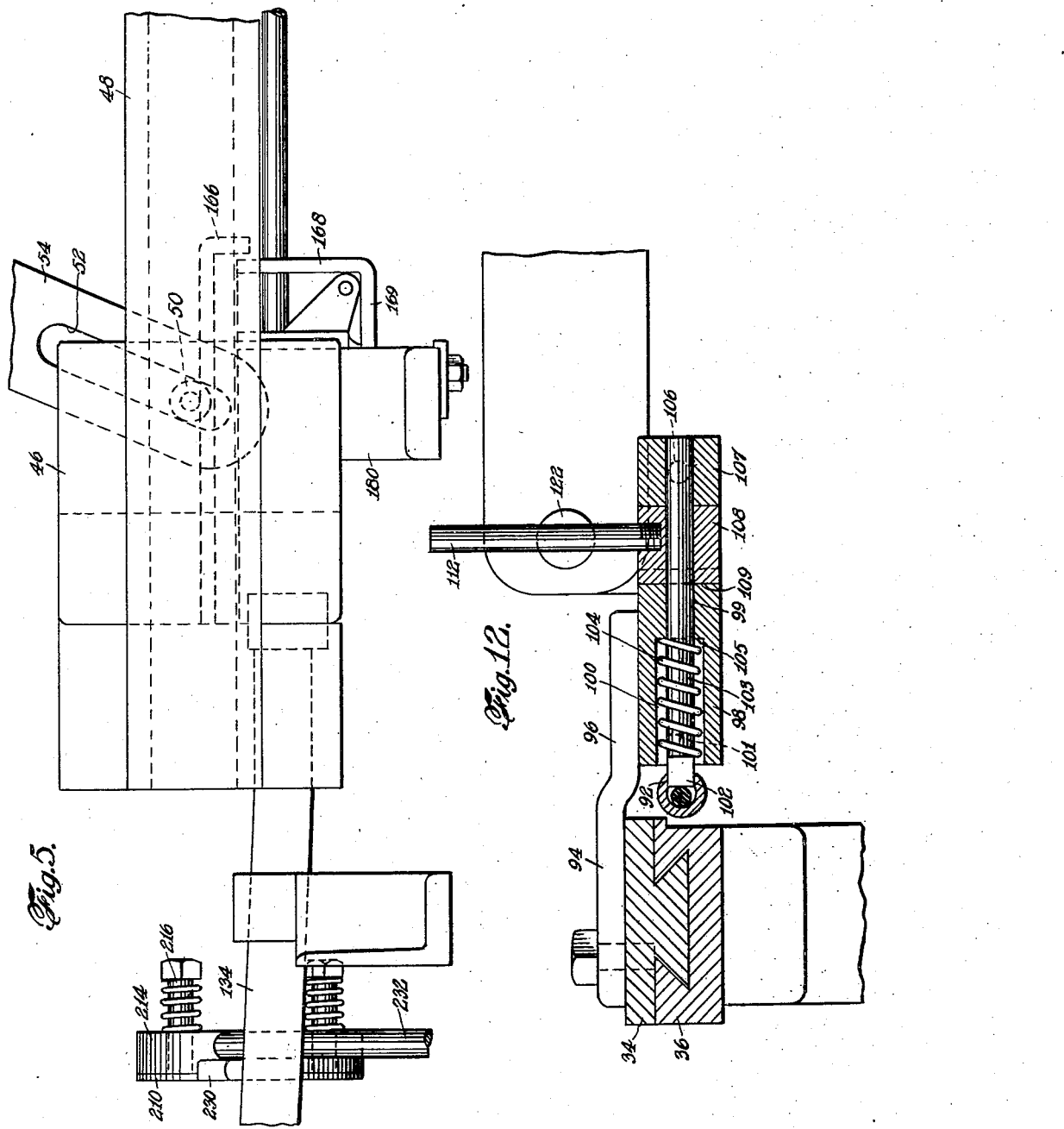

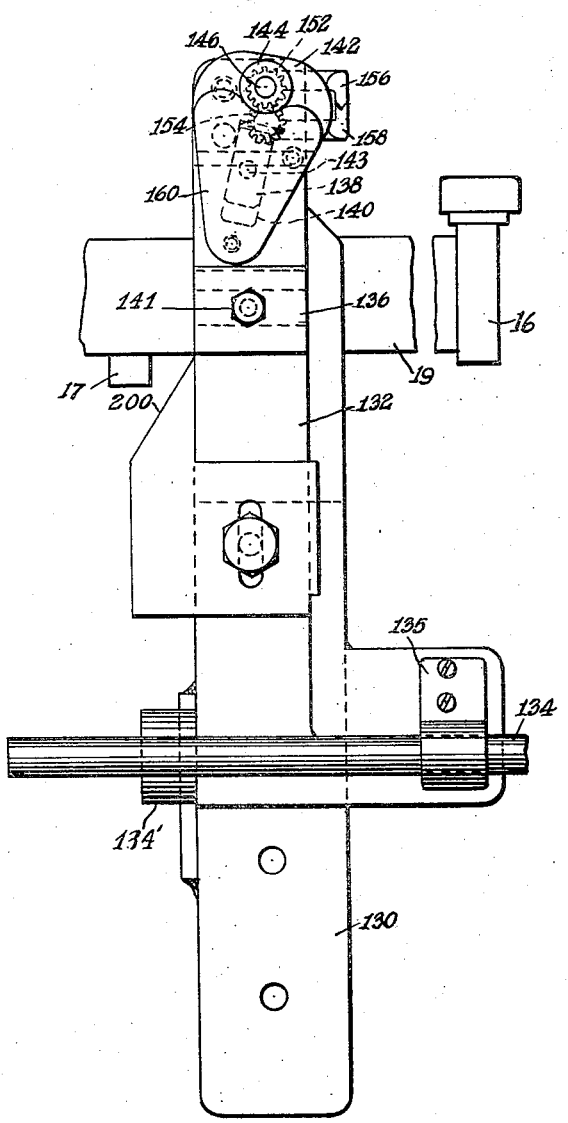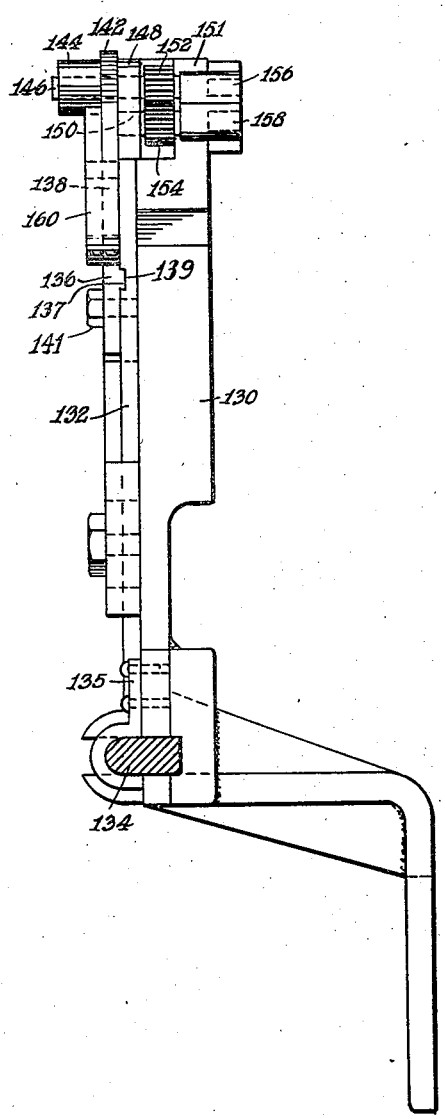

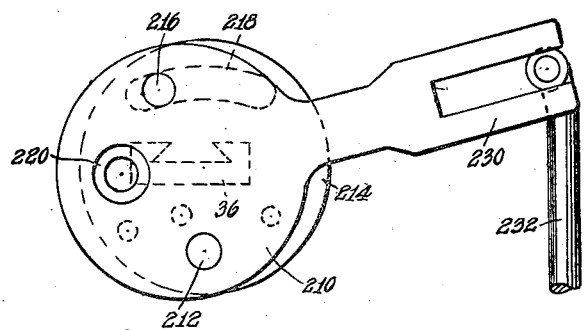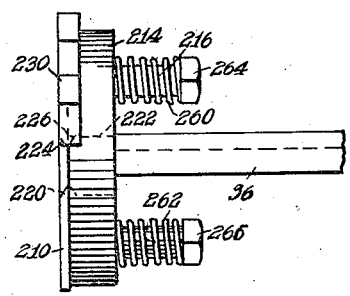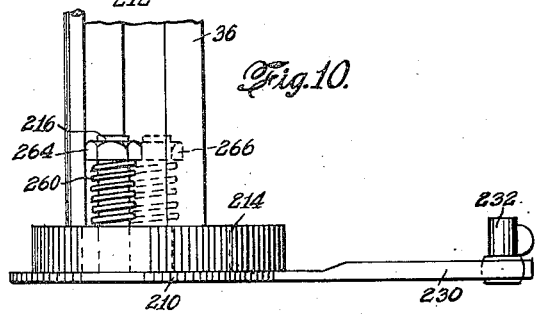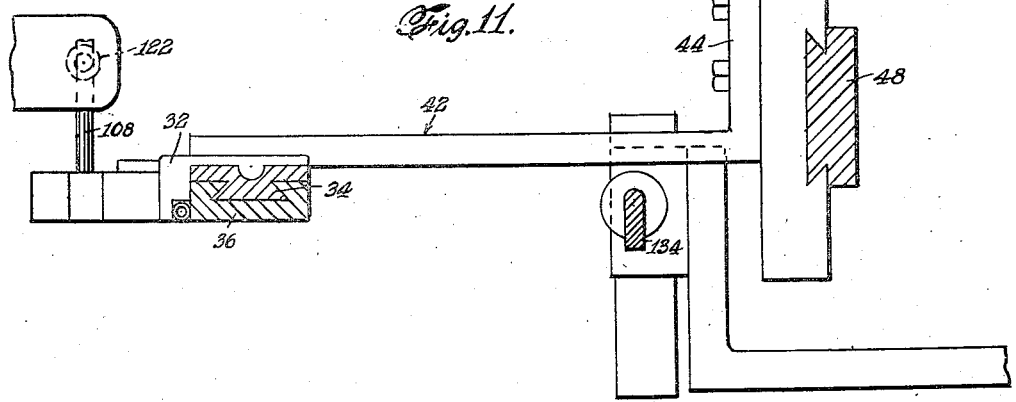

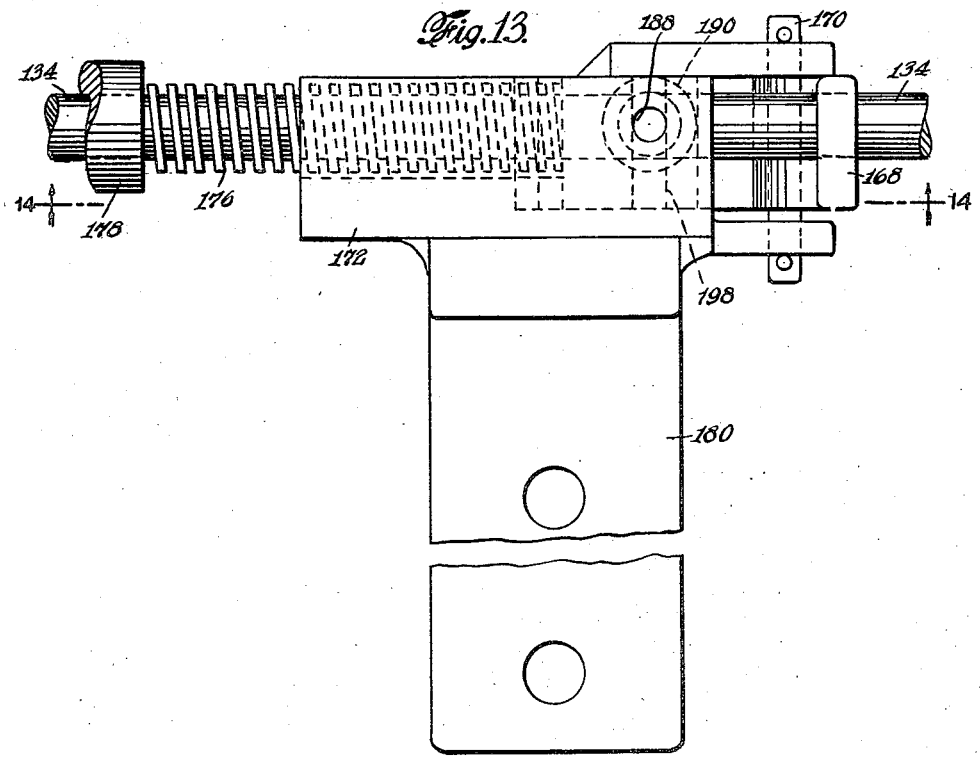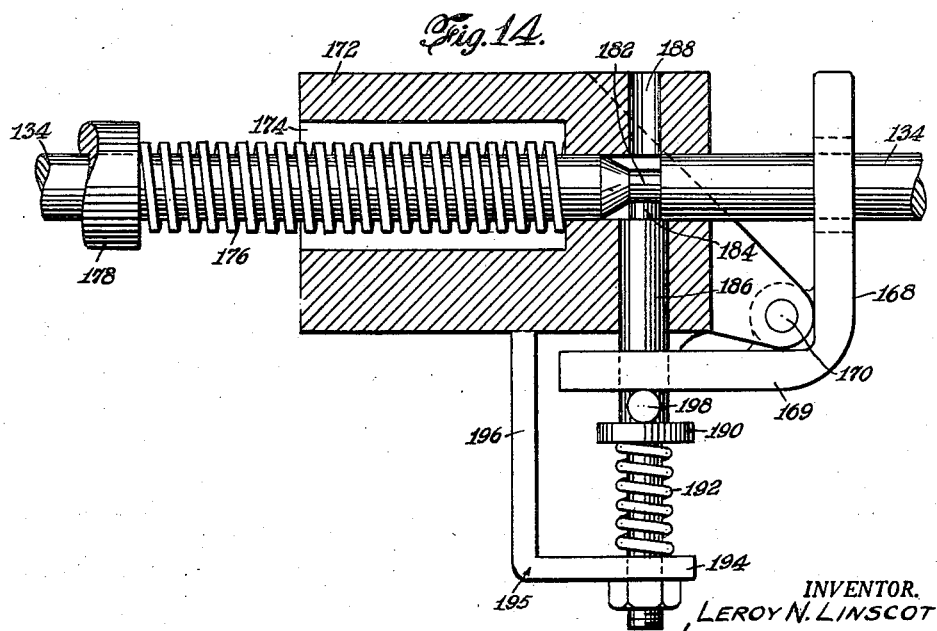

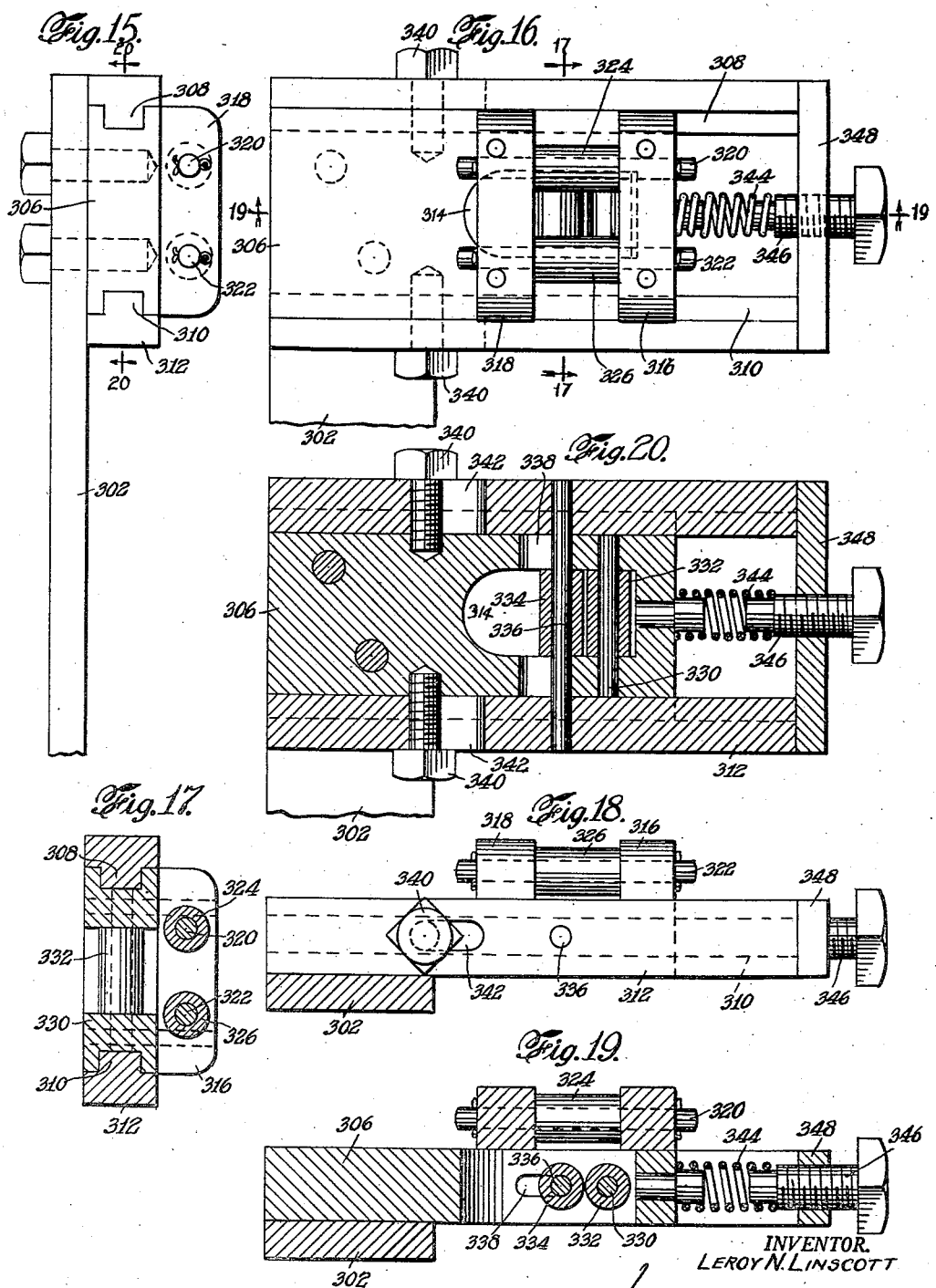

2,408,861

UNITED STATES PATENT OFFICE 2,408,861

LOOM

Leroy N. Linscott, Yonkers, N. Y., assignor to Alexander Smith & Sons Carpet Company, Yonkers, N. Y., a corporation of New York Application October 12, 1943, Serial No. 505,912

8 Claims. (Cl. 139—127)

This invention relates to a method and apparatus for making pile fabrics for use as a reinforcement or support in molded articles. More particularly, this invention relates to a loom for making a looped pile fabric having a filler extending transversely of the fabric through the loops of each row of looped pile and secured in the fabric by said loops.

In copending application Serial No. 448,802, filed June 27, 1942, for "Reinforcements and molded articles containing the same," there is described an article of manufacture for use as a reinforcement in molded articles comprising a pile fabric having rows of looped pile and a filler positioned within and extending through the loops of each row thereof. As further disclosed in said application, the looped pile fabric, including the filler extending through the loops thereof, is utilized as a reinforcement in the manufacture of molded articles, the nature of the pile filler depending on the material to be molded. For example, and as further disclosed in said application, when the reinforcement is to be used in the manufacture of molded rubber materials, such as re-treads for automobile tires, the pile filler is formed of rubber.

An object of this invention is to provide a method of making a looped pile fabric having a filler extending transversely of the fabric and passing through a row of looped pile.

Another object of this invention is to provide a method of making a fabric having a looped pile on one side thereof and, during the production of such fabric, interweaving a filler which extends transversely of the fabric and passes through each row of looped pile.

Another object of this invention is to provide an apparatus for carrying out the previously mentioned method.

A further object of this invention is to provide a loom for weaving a pile fabric of the type previously mentioned.

Other objects will become apparent from the following description.

The objects of this invention are, in general, accomplished by laying the pile filler in the shed during the weaving operation and just prior to the formation of the looped pile whereby, upon formation of the looped pile, the pile filler will be interwoven in the fabric and each filler will extend transversely through each row of looped pile. As will hereafter be more fully explained, during the weaving of the looped pile fabric and just prior to the looping of the pile warp the pile filler is laid in position in the shed by a hollow needle that carries the filler and to which it is temporarily secured. The needle is reciprocated transversely of the shed. At the end of the forward movement of the needle, the leading end of the pile filler which projects from the front end of the needle and beyond the edge of the shed is gripped by grippers positioned adjacent one edge of the shed and the means securing the filler to the needle actuated to release the filler. The needle is then returned to its original position, and a cutting mechanism adjacent the other edge of the shed is actuated to sever the filler. The grippers are then actuated to release the filler. While in its original position, the filler is secured in the needle and the cycle of steps repeated until the desired length of fabric is woven. The various mechanisms hereinbefore generally referred to are embodied in a standard loom and are actuated and operated in timed relationship with each other and with the other operating parts of the loom.

In order to more fully explain the details of the invention, a specific illustrative embodiment will now be described in connection with the accompanying drawings illustrating the same, and wherein:

Figure 1 is a front elevation of a loom (Crompton & Knowles Jacquard loom) embodying the invention;

Figure 2 is a top plan view of the apparatus constituting the invention, the other features of the loom being omitted for convenience and clarity;

Figure 3 is a front elevation of the apparatus shown in Figure 2;

Figure 4 is an enlarged plan view of the apparatus showing the needle at the end of its forward movement, and showing the means for releasing the filler from the tube, the cutting mechanism, and a portion of the mechanism for actuating the grippers;

Figure 5 is an enlarged front view of the apparatus shown in Figure 4;

Figure 6 is a plan view of the grippers and the means for actuating the grippers to open position;

Figure 7 is an elevation of the grippers as viewed from the right of Figure 6 with the means for actuating the grippers to open position omitted;

Figure 8 is a side elevation of the cutting mechanism;

Figure 9 is an end view of the cutting mechanism as viewed from the right of Figure 8;

Figure 10 is a top view of the cutting mechanism;

Figure 11 is a section taken on the line 11—11 of Figure 4;

Figure 12 is a section taken on the line 12—12 of Figure 4;

Figure 13 is a top plan view of the gripper actuating mechanism;

Figure 14 is a section taken on the line 14—14 of Figure 13;

Figure 15 is a front elevation of the tension device;

Figure 16 is a side elevation of the tension device looking to the left of Figure 15;

Figure 17 is a section taken on the line 17—17 of Figure 16;

Figure 18 is a bottom view of the tension mechanism shown in Figure 16;

Figure 19 is a section taken on the line 19—19 of Figure 16; and

Figure 20 is a section taken on the line 20—20 of Figure 15.

Referring now to the drawings, wherein like reference numerals designate like parts, and particularly to Figure 1, there is shown the well-known Crompton & Knowles ¾ Jacquard loom which comprises a cumber board 2, the heddles 4, the heddle cam lever 6, the heddle drive gear 8, the lash cords 10, the reed 12, the shuttle boxes 14, the lay swords 16, the picker sticks 18, the lay 19, the rocker shaft 20, and the take-up hand wheel 22. The ground warps, the binding warps and the pile warps are fed to the loom in the usual manner. Since the other details of construction of such Crompton & Knowles loom are well known and the method of operation of the same is also well known, further description of the standard parts of the loom, except as modified by the instant invention and which will hereafter be more fully set forth, is deemed unnecessary.

Still referring to Figure 1, the means for laying the pile filler transversely of the shed, the gripper mechanism and the cut-off mechanism are generally indicated by the reference characters A, B and C respectively. In order to permit feeding and laying of the pile filler F under proper tension and to inhibit flying and tangling thereof as it is led to the filler-laying means during the operation of the loom, a tension device, generally indicated by the reference character E (see Figure 3), is provided.

The pile filler-laying mechanism A comprises a hollow needle 30 which lays the pile filler transversely of the shed in position for the pile warp to be looped thereover. The needle 30 is secured to and carried by a plurality of spaced straps 32 attached to a holder 34 slidably mounted on a rail 36 (see Figure 11) carried by the frame of the loom. The holder 34 is provided with a pin 38 which cooperates with a slot 40 in one arm of a bracket 42. The other arm 44 of the bracket 42 is secured to a slide 46 slidably mounted on a rail 48 carried by the frame of the loom. The holder 34, together with the bracket 42 and the slide 46, may be termed a carriage. As shown in Figure 5, the slide 46 is provided with a pin 50 which is positioned in a slot 52 in one end of a lever 54, the other end of the lever 54 being pivotally mounted at 56 on a support 58 carried by the frame of the loom. The lever 54 is connected by an adjustable and resilient link 60 to a lever 62. As shown in Figure 3, the link 60 comprises heads 63 and 64. The head 63 is threadedly secured on a rod 66. The head 64 is slidably mounted on said rod 66. For reasons which will become apparent from the description hereafter, a compression spring 68 is located between a nut 70 and the bottom of the head 64, and a spring 72 is located in the head 64.

The lever 62 is pivotally mounted at 76 and at its lower end carries a cam roller 78 which rides in a cam slot 80 in a cam 82. The cam 82 is mounted on a shaft 84 which is driven from the main drive shaft through suitable and appropriate connections (not shown). It will thus be seen that as the cam 82 rotates, the lever 62 will be rocked about its pivot 76 and the motion of the lever 62 will, through the resilient link 60, move the lever 54 back and forth about the pivot 56, whereby reciprocatory movement will be imparted to the carriage carrying the needle. Adjustable stops 86 and 88 are provided at the end of the travel of the carriage in each direction. By appropriate design of the cam slot 80, the lever 54, and adjustment of the resilient link 60, the length of path of travel of the carriage may be made as desired.

The springs 68 and 72 of the resilient link 60 serve to cushion and facilitate the movement of the lever 54 during operation. For convenient movement, the resilient link 60 is secured to the lever 62 by means of a pin 89 fastened in the slot 90.

The needle 30 is of a length so that when the carriage is advanced to its extreme inward movement, it will extend throughout the width of the shed and present the leading end of the filler pile in position to be gripped by the grippers B. The needle is provided with an opening 92 in its wall intermediate the ends. Secured to the holder 34 is a bracket 94 carrying an arm 96 to which the member 98 is secured. The member 98 is provided with a bore 99 which communicates with an enlarged bore 100 terminating in a slot 101. An enlarged head 102 on one end of a plunger 103 is positioned in the slot 101. A spring 104, cooperating with the enlarged head 102 and the shoulder 105, normally urges the enlarged head 102 forwardly into and through the opening 92 of the needle 30, whereby the pile filler is clamped to the needle. The plunger 103 is secured at 106 to a collar 107. Intermediate the member 98 and the collar 107 there is provided a plunger-operating cam 108 having a V-shaped cam segment 109 and adapted to lie in a V-shaped slot provided in the free end of the member 98 when the head 102 is in clamping position. The plunger-operating cam 108 is provided with a cam lever 112 which is adapted to be engaged to actuate the cam 108 to position the plunger 103 in position to either clamp the pile filler to the needle or be in inoperative position, as will now be explained.

Just prior to the end of the inward movement of the carriage, the cam lever 112 engages a stop 122 carried on the frame of the loom, which rotates the plunger-operating cam 108 in a direction to cause the cam segment 109 to ride on the member 98 and thereby withdraw the plunger 103, whereby the head 102 is removed from clamping position and the pile filler will be released. When the carriage is at its extreme inward movement, the needle will extend transversely of the shed and the pile filler F will be in position to be gripped by the grippers B upon actuation thereof. When the carriage is retracted to its original position, a member 124 will engage the cam lever 112 and rotate the same until the cam segment 109 is in the slot, whereby the plunger 103 will be urged inwardly and the head 102 will clamp the pile filler to the needle.

The gripper mechanism B (see Figures 6 and 7) is carried by a bracket 130 mounted on the loom frame. An arm 132 is secured to a rod 134 which passes through a guide 135 secured to the bracket 130 and a guide 134' carried by the frame and which is adapted to be moved transversely in both directions in a horizontal plane, as will be hereafter explained. In the form shown in Figure 6, the rod 134 is secured to the arm 132. Keyed to the arm 132 is a plate 136. As also shown in Figures 6 and 7, the plate 136 is provided with a tongue 137 which is slidably positioned in a groove 139 in the arm 132, whereby the plate 136 may be positioned relative to the arm 132. A nut 141 secures the plate 136, after adjustment, to the arm 132. A slide 138 is pivotally secured by a stud 143 to the plate 136. The slide 138 is positioned in and cooperates with a slot 140 in a heart-shaped member 142. The heart-shaped member 142 is provided with a boss 144, in which one end of a shaft 146 is secured. The bracket 130 is provided with a member 148 through which the shaft 146 passes and which serves as a journal for one end of a shaft 150. It is to be noted that the shafts 146 and 150 also are rotatably positioned in an extension 151 of the bracket 130. Gears 152 and 154 are securely mounted on the shafts 146 and 150 respectively in meshing relationship. A male gripper member 156 and a female gripper member 158 are secured to the shafts 146 and 150 respectively. A cover plate 160 is provided on the heart-shaped member 142. It will thus be seen that (assuming the grippers 156 and 158 are in open position) when the rod 134 is moved horizontally to the left in Figure 6, the arm 132 will move therewith, causing the slide 138 to move in the slot 140 of the heart-shaped member 142 in such a direction that the heart-shaped member 142 will rotate the shaft 146, and hence the gear 152 will rotate. Rotation of the gear 152 will rotate the gear 154 and the shaft 150 on which it is carried, whereby the female gripping member 158 will move into gripping relationship with the male member 156 to seize and hold the pile filler presented by the needle. Movement of the rod 134 in the opposite direction will cause the slide 138 to move in a direction whereby the grippers 156 and 158 will be disengaged and the pile filler released.

The gripping mechanism is actuated to grip the leading end of the pile filler in timed relationship with the movement of the needle carriage, as will now be described.

The carriage, and particularly the slide 49 thereof, is provided with a trip member 166 so positioned that when the carriage is at its extreme inward movement it will engage a bell-crank lever 168, which is pivotally mounted at 170 on the frame of the loom to actuate a mechanism to cause the rod 134 to move to the left, as shown in Figure 6. This mechanism, as shown in Figures 13 and 14, comprises a block 172 having a horizontal bore 174 therein through which the rod 134 extends and in which an expansion spring 176 is positioned. It is to be noted that one end of the spring 176 engages the base of the bore 174 in the block 172, the other end of the spring cooperating with a stop member 178 positioned on the rod 134, whereby the spring 176 tends to urge the rod 134 to actuate the grippers 156 and 158 into closed gripping relationship. The block 172 is carried on a bracket 180 mounted on the frame of the loom.

To maintain the grippers 156 and 158 in open, non-gripping relationship in position to receive the leading end of the pile filler, the rod 134 is provided with a reduced portion 182 which is adapted to be engaged and locked in position by a head 184 of a plunger 186 positioned in a vertical bore 188 of the block 172. As shown in Figure 14, the plunger 186 is provided at its lower end with an enlarged head 190 which is in cooperative relationship with an expansion spring 192 carried on a horizontal leg 194 of a support 195, the vertical leg 196 thereof being fixedly secured to the block 172. The spring 192 normally tends to urge the plunger 186 upwardly into position to lock the rod.

To release the rod 134 from locked position, the plunger adjacent the enlarged head 190 is provided with a pin 198 cooperating with the horizontal arm 169 of the bell-crank lever 168. It will thus be seen that when the trip member 166 engages the vertical arm of the bell-crank lever 168, the bell-crank lever will move about the pivot 170, causing the horizontal arm 169 to engage the pin 198 and depress the plunger against the action of the spring 192, and removing the head 184 from locking relationship with the reduced portion 182 of the rod 134. The expansion spring 176, upon the release of the shaft by the plunger, will cause it to move toward the left in Figure 14, a suitable stop being provided to limit the movement of the rod 134.

After the leading end of the pile filler has been gripped, the needle 30 is withdrawn to its original position where the filler is secured therein, as previously described. When the needle has been retracted, the cutting mechanism C cuts the filler and, substantially simultaneously with the cutting, a member 17 carried by the lay 19 which is oscillated by the lay swords 16 strikes against a cam 200 adjustably secured on the arm 132, causing the arm 132 to actuate the grippers to open, non-gripping relationship through the mechanism previously described. This movement of the arm 132, effected by the lay, also causes the rod 134 to move to the right of Figure 6 and against the action of the expansion spring 176. The contour of the cam 200 is such that when engaged by the lay it will move the rod 134 sufficiently to the right, as viewed in Figures 6 and 14, to permit the plunger 186 to engage the reduced portion 182 of the rod 134 and again lock it in position.

After the needle has been retracted, the grippers release the pile filler yarn substantially at the moment the filler pile is severed by the mechanism generally indicated by the reference character C and shown in Figures 8, 9 and 10, to which reference will now be had.

The cutting mechanism comprises an oscillating disc 210 which is pivotally mounted at 212 on a stationary disc 214. The oscillating disc 210 is provided with a pin 216 on the outer face thereof which cooperates with an arcuate slot 218 formed in the stationary disc 214. The two discs 210 and 214 are provided with aligned apertures 220 and 222, each of said holes being provided with a beveled cutting edge 224 and 226 respectively. The holes 220 and 222 are normally in aligned relationship and of a diameter to permit the passage of the needle therethrough in the needle's travel to lay the pile filler thread in the shed. The movable disc 210 is provided with an integral forked lever 230 which is secured to a rod 232. As shown in Figure 3, the rod 232 is connected at 234 to one end of the bell-crank lever 236, which is pivoted at 238. The other arm 240 of the bell-crank lever 236 is connected by an adjustable link 241 to one end of a lever 242, the other end 244 of the lever 242 being secured in the frame. Intermediate its ends, the lever 242 is provided with a cam roller 246 which cooperates with the cam surface 248 also on the cam 82. Springs 250 and 252 connect the link 241 and the lever 242, respectively, to a rigid member 254 carried by the frame of the loom. It will thus be seen that when the raised portion 256 of the cam surface 248 engages the cam roller 246, the oscillating member 210 will be caused to move about its pivot 212 whereby the cutting edges 224 and 226 will shear the filler thread. A pair of springs 260 and 262, engaging nuts 264 and 266 carried by pins 216 and 212 respectively, engages the rear face of the stationary disc 214 and serves to maintain it in close contactual relationship with the oscillating disc. It is to be noted that the cut-off mechanism severs the pile filler at a point spaced from the inner end of the needle so as to provide a length of filler projecting from the needle to be gripped by the gripper. After cutting the pile filler, it is beaten into the fabric by the reed 12 and the pile warp looped thereover.

The pile filler thread F is withdrawn from a source of supply 300 and fed to the needle 30. In order to apply the proper tension to the pile filler thread and to inhibit it from whipping during the operation of the loom, the tension device, generally designated by the reference character E, is provided. As shown in Figure 3, the tension device is carried on a bracket 302 which is secured to a stand 304. Secured to the bracket 302 is a fixed member 306 which is provided in its upper and lower edges with grooves in which ribs 308 and 310 of a frame 312 are slidably mounted. The fixed member 306 is provided with an opening 314 and a pair of parallel members 316 and 318 which constitute bearings for the shafts 320 and 322 carrying a pair of horizontal idler rollers 324 and 326. The fixed frame also is provided with a vertical shaft 330 on which a vertical roll 332 is carried. A vertical roll 334 is mounted on the shaft 336 which is secured in the slidable frame 312. The shaft 336 cooperates with slots 338 in the fixed member 306. The fixed member 306 is secured to the slidable member 312 by means of bolts 340. It is to be noted that the bolts 340 pass through slots 342 in the slidable member 312. A spring 344 is secured to the fixed member 306, and the other end secured to a bolt 346 passing through the vertical member 348 of the slidable frame.

In operation, the pile filler thread is caused to pass between the horizontally disposed rolls 324 and 326 and thence between the passage formed by the vertical rolls 332 and 334. Whenever a thickened portion attempts to pass between the vertical rolls 332 and 334, the vertical roll 334 will move laterally. This is due to the fact that the shaft thereof is secured in the frame 312, and such movement is permitted by virtue of the slots 338 in the fixed member 306. The lateral movement of the shaft 336 causes the movable frame 312 to act against the pressure of the spring 344, causing the slidable frame 312 to move relative to the fixed frame 306. When the thickened portion has been eliminated or has passed by, the action of the spring 344 will restore the position of the vertical roller.

It is apparent that the composition of the pile filler F depends on the ultimate use of the reinforcement. When the reinforcement is to be used in the manufacture of rubberized material, the pile filler is preferably formed of rubber strand. Though various cross-sections of the pile filler may be used, best results are obtained when it is circular in cross-section and is substantially continuous in length. When such a filler is used, the loom, and particularly the apparatus hereinbefore described, should be adjusted so that when the filler is laid and interwoven in the fabric, it will be in a relaxed condition or under sufficient tension to permit it to lay straight in the fabric and control the length of pile filler that is laid in the fabric.

The various mechanisms herein described are designed to be actuated in timed relationship with respect to each other and with respect to the other operating mechanisms of the loom. It will be apparent to a person skilled in the art that the various elements of the apparatus herein described may be adjusted and controlled within wide limits and, though the invention has been applied to a Crompton & Knowles Jacquard loom, it is not restricted thereto since it can be applied to any loom making a looped pile fabric.

Since it is obvious that various changes and modifications may be made in the above description without departing from the nature or spirit thereof, this invention is not restricted thereto except as set forth in the appended claims.

I claim:

1. In a loom for making a looped pile fabric, pile filler gripping means adjacent one edge of the shed, pile filler severing means adjacent the other edge of the shed, a hollow needle, said needle having an opening intermediate the ends thereof, a plunger positioned in said opening, a plunger-operating cam, means to actuate said cam to depress said plunger to secure the pile filler in said needle, means to move said needle transversely of the shed and present the leading end of the pile filler in position for gripping by said gripping means, means to actuate said gripping means to grip said leading end presented by said needle, means to actuate said plunger-operating cam to withdraw said plunger to release the pile filler from said needle, means to retract the needle to its original position, means to actuate the severing mechanism to sever the pile filler after the needle has been retracted to its original position, and means to actuate said gripping means to release said pile filler.

2. In a loom for making a looped file fabric, pile filler gripping means adjacent one edge of the shed, pile filler severing means adjacent the other edge of the shed, a carriage having a hollow needle secured thereto, means to reciprocate said carriage to move said needle back and forth across the shed, said needle having an opening intermediate the ends thereof, a plunger positioned in said opening, a plunger-operating cam, means to actuate said cam to depress said plunger to secure the pile filler in said needle prior to its inward movement across the shed, means on said carriage to actuate said gripping means to grip the leading end of the pile filler presented by said needle, means to actuate said plunger-operating cam to withdraw said plunger to release the pile filler from said needle prior to retracting the needle to its original position, means to actuate the severing mechanism to sever the pile filler after the needle has been retracted to its original position, and means to actuate said gripping means to release said pile filler.

3. In a loom for making a looped pile fabric having a lay, pile filler gripping means adjacent one edge of the shed, pile filler severing means adjacent the other edge of the shed, a carriage having a hollow needle secured thereto, means to reciprocate said carriage to move said needle back and forth across the shed, means to secure the pile filler in said needle prior to its inward movement across the shed, means on said carriage to actuate said gripping means to grip the leading end of the pile filler presented by said needle, means to release the pile filler from said needle prior to retracting the needle to its original position, means to actuate the severing mechanism to sever the pile filler after the needle has been retracted to its original position, and means operated by the lay to actuate said gripper means to release said pile filler.

4. In a loom for making a looped pile fabric, means to lay a pile filler transversely of the shed, gripping means adjacent one edge of the shed to grip the leading end of said pile filler, and cutting means adjacent the other edge of the shed to sever said filler material, said cutting means comprising a fixed disc provided with an aperture having a cutting edge, a disc pivotally mounted on said fixed disc and provided with an aperture having a cutting edge, said apertures normally being in alignment to permit passage of the pile filler therethrough, and means to oscillate the pivotally mounted disc whereby the cutting edges will sever the pile filler.

5. In a loom for making a looped pile fabric, means to lay a pile filler transversely of the shed, gripping means adjacent one edge of the shed to grip the leading end of said pile filler, and cutting means adjacent the other edge of the shed to sever said filler material, said cutting means comprising a fixed disc provided with an aperture having a cutting edge, a disc pivotally mounted on said fixed disc and provided with an aperture having a cutting edge, said apertures normally being in alignment to permit passage of the pile filler therethrough, means to oscillate the pivotally mounted disc whereby the cutting edges will sever the pile filler, and means to limit the extent of movement of said pivotally mounted disc during the oscillation thereof.

6. In a loom for making a looped pile fabric, means to lay a pile filler transversely of the shed, gripping means adjacent one edge of the shed to grip the leading end of said pile filler, and cutting means adjacent the other edge of the shed to sever said filler material, said cutting means comprising a fixed disc provided with an aperture having a cutting edge, a disc pivotally mounted on said fixed disc and provided with an aperture having a cutting edge, said apertures normally being in alignment to permit passage of the pile filler therethrough, a pin on the pivotally mounted disc cooperating with an arcuate slot in the fixed disc, and means to oscillate the pivotally mounted disc at predetermined intervals whereby the cutting edges will sever the pile filler.

7. In a loom for making a looped pile fabric having a lay, a reciprocating carriage provided with a hollow needle carrying a pile filler, a slidably mounted rod, an arm secured to said rod carrying a slide, a shaft, a plate secured to said shaft and having a slot cooperating with said slide, a gripper element on said shaft, a second shaft, a second gripper element on said second shaft, a gear on each of said shafts, said gears being in meshing relationship, means to lock said rod against sliding movement to maintain said gripper elements in open position, means on the carriage to release the locking means to permit sliding movement of the rod whereby movement of said arm will cause said gripper elements to move relative to each other to grip the leading end of the pile filler presented thereto by said needle, and means on said arm positioned to be engaged by the lay to actuate the gripper-operating mechanism to release the pile and move said rod into locking position.

8. In a loom for making a looped pile fabric having a lay, a reciprocating carriage provided with a hollow needle carrying a pile filler, a slidably mounted rod, an arm secured to said rod carrying a slide, a shaft, a plate secured to said shaft and having a slot cooperating with said slide, a gripper element on said shaft, a second shaft, a second gripper element on said second shaft, a gear on each of said shafts, said gears being in meshing relationship, a block having a bore through which said rod extends, a spring-pressed plunger in said block adapted to engage a reduced portion of said rod in said bore to lock said rod against sliding movement, means actuated by the movement of the carriage to release said plunger from locking relationship with said rod, spring means to slidably move said rod upon release of the locking means to actuate said gripper elements to move relative to each other to grip the leading end of the pile filler presented thereto by said needle, and a cam on said arm positioned to be actuated by the lay to actuate the gripper-operating mechanism to release the pile.

LEROY N. LINSCOTT.